United States Patent
Tsumiyama et al.

(10) Patent No.: US 9,731,775 B1
(45) Date of Patent: Aug. 15, 2017

(54) CARGO BED FOR UTILITY VEHICLE

(71) Applicant: KAWASAKI JUKOGYO KABUSHIKI KAISHA, Hyogo (JP)

(72) Inventors: Yoshinori Tsumiyama, Miki (JP); Takashi Hisamura, Kakogawa (JP)

( * ) Notice: Subject to any disclaimer, the term of this patent is extended or adjusted under 35 U.S.C. 154(b) by 0 days.

(21) Appl. No.: 15/153,777

(22) Filed: May 13, 2016

(51) Int. Cl.
*B62D 33/02* (2006.01)
*B62D 33/023* (2006.01)
*B62D 33/027* (2006.01)
*B62D 29/00* (2006.01)

(52) U.S. Cl.
CPC ....... *B62D 33/0276* (2013.01); *B62D 29/007* (2013.01); *B62D 33/02* (2013.01); *B62D 33/023* (2013.01); *B62D 33/027* (2013.01)

(58) Field of Classification Search
CPC  B62D 33/023; B62D 33/027; B62D 33/0276; B62D 33/02
USPC ............................................ 296/183.1, 183.2
See application file for complete search history.

(56) References Cited

U.S. PATENT DOCUMENTS

| | | | | |
|---|---|---|---|---|
| 1,447,619 A | * | 3/1923 | Ledwinka | B60P 1/286 296/183.1 |
| 2,711,342 A | * | 6/1955 | Selzer | B62D 33/023 296/32 |
| 3,841,660 A | * | 10/1974 | Clark | B62D 33/023 248/231.41 |
| 4,076,298 A | * | 2/1978 | Hanzelka | B62D 33/023 296/191 |
| 4,582,337 A | * | 4/1986 | Hsueh | B60D 1/34 280/455.1 |
| 6,033,002 A | * | 3/2000 | Clare | B60J 10/00 224/404 |
| 6,394,555 B2 | * | 5/2002 | Mizuta | B62D 31/003 296/183.2 |
| 8,857,880 B2 | * | 10/2014 | Kalergis | B60P 1/43 224/403 |
| 8,864,208 B2 | | 10/2014 | Kaku et al. | |
| 9,187,023 B2 | | 11/2015 | Takahashi et al. | |
| 2003/0001409 A1 | * | 1/2003 | Semple | B62D 33/02 296/183.1 |
| 2005/0057073 A1 | * | 3/2005 | Hunt | B60J 5/0497 296/183.1 |
| 2005/0236867 A1 | * | 10/2005 | McNulty | B62D 33/023 296/183.1 |
| 2005/0242620 A1 | * | 11/2005 | McNulty | B62D 33/02 296/183.1 |
| 2009/0115222 A1 | * | 5/2009 | Hohnl | B60Q 1/30 296/183.1 |
| 2013/0038087 A1 | * | 2/2013 | Woodard, Jr. | B62D 25/2054 296/182.1 |

(Continued)

*Primary Examiner* — Gregory Blankenship
(74) *Attorney, Agent, or Firm* — Wenderoth, Lind & Ponack, L.L.P.

(57) ABSTRACT

A cargo bed for a utility vehicle includes a bottom plate, and a pair of right and left side walls extending upward from right and left ends of the bottom plate. The side walls each include a front pillar extending vertically at a front end, a rear pillar extending vertically at a rear end, a side panel extending between the front pillar and the rear pillar in an anteroposterior direction and having a rib extending in the anteroposterior direction, and a bed rail positioned above the side panel with a space being provided therebetween, and extending between the front pillar and the rear pillar in the anteroposterior direction.

5 Claims, 8 Drawing Sheets

(56) References Cited

U.S. PATENT DOCUMENTS

| | | | |
|---|---|---|---|
| 2014/0225395 A1* | 8/2014 | Takata | B62D 23/005 296/183.1 |
| 2015/0123425 A1* | 5/2015 | Huston | B62D 33/023 296/183.1 |
| 2016/0144761 A1* | 5/2016 | Olli | B62K 5/01 296/183.1 |

* cited by examiner

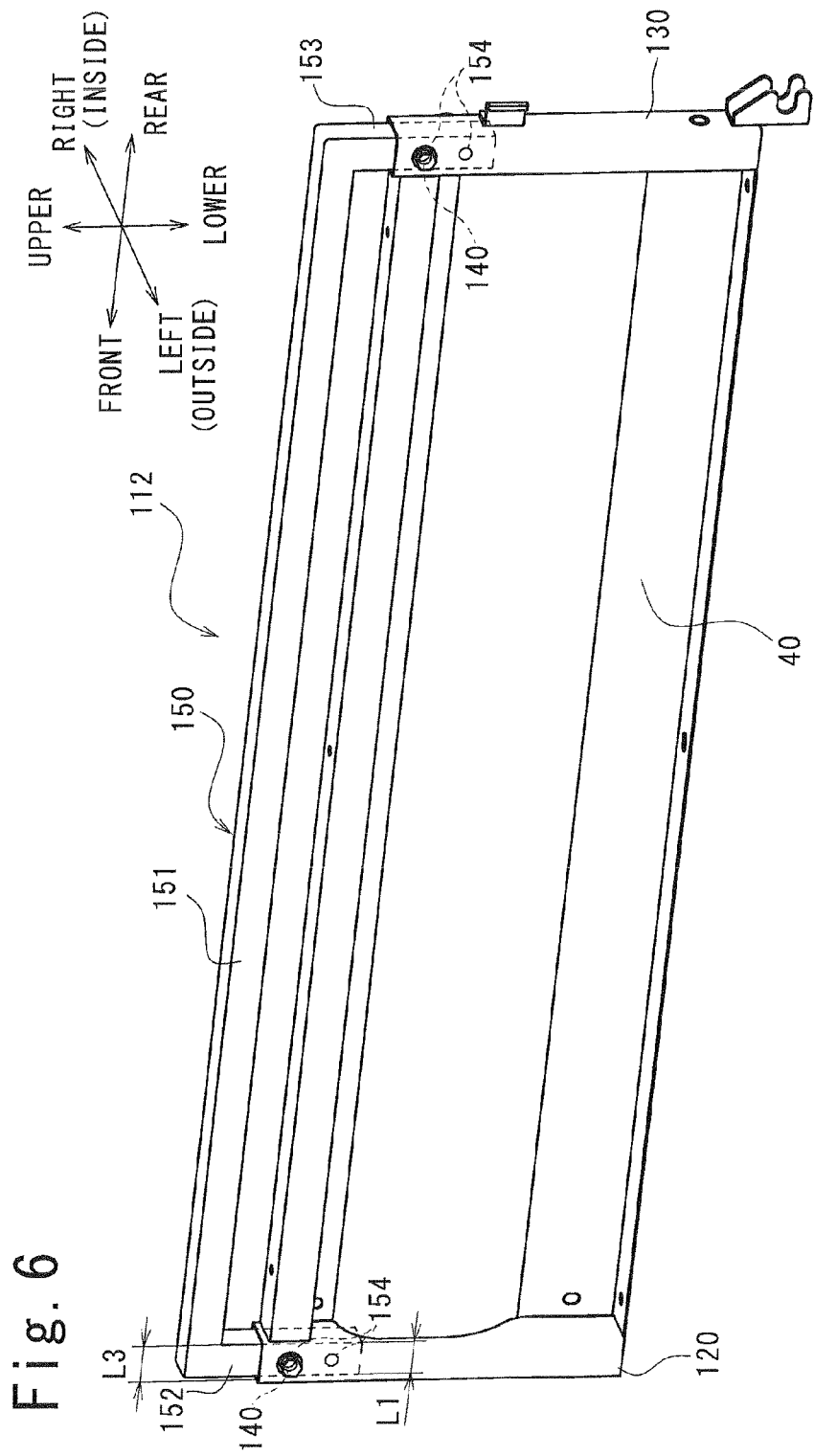

CARGO BED FOR UTILITY VEHICLE

BACKGROUND OF THE INVENTION

Field of the Invention

The present invention relates to a cargo bed for a utility vehicle.

Description of the Related Art

There has conventionally been known a cargo bed for a utility vehicle, which includes a side wall provided thereabove with a bed rail with a space therebetween. The bed rail is utilized for multiple purposes, such as hanging a cargo locking rope from the bed rail, attaching an accessory to the bed rail, or the like with use of the space.

For example, U.S. Pat. No. 8,864,208 discloses a side wall of a cargo bed configured by a resin side panel. The side panel is integrally provided, at front and rear ends, with a pair of support legs that support a bed rail provided therebetween. U.S. Pat. No. 9,187,023 discloses a side wall provided with a side panel at a framework except for its upper portion. The upper portion of the framework exposed from the side panel serves as a bed rail.

SUMMARY OF THE INVENTION

According to U.S. Pat. No. 8,864,208, the side wall is configured by the resin side panel, and front and rear ends of the bed rail are supported by the resin side panel. In order to improve rigidity for supporting the bed rail in this configuration, the side panel is integrally provided with an intermediate support leg supporting from below an intermediate portion in the anteroposterior direction of the bed rail.

According to U.S. Pat. No. 9,187,023, the framework secures rigidity of the side wall, and includes a front pillar extending vertically at a front end, a rear pillar extending vertically at a rear end, and an intermediate pillar extending vertically at a substantially intermediate position in the anteroposterior direction. The bed rail configured by the upper portion of the framework is also supported from below by the intermediate pillar at an intermediate portion in the anteroposterior direction.

Each of these bed rails is supported from below also at the intermediate portion in the anteroposterior direction, and thus has a complicated structure and is not produced easily. Furthermore, the space is not provided between the bed rail and the side panel at the intermediate portion. This inhibits utilization of the bed rail at any position along its entire length.

The present invention has been made in view of the problems mentioned above, and an object thereof is to provide a cargo bed for a utility vehicle, which firmly supports a bed rail and enables utilization of the bed rail along its substantially entire length.

In order to achieve the object mentioned above, the present invention provides a cargo bed for a utility vehicle including a bottom plate, and a pair of right and left side walls extending upward from right and left ends of the bottom plate, in which the side walls each include a front pillar extending vertically at a front end, a rear pillar extending vertically at a rear end, a side panel extending between the front pillar and the rear pillar in an anteroposterior direction and having a rib extending in the anteroposterior direction, and a bed rail positioned above the side panel with a space being provided therebetween, and extending between the front pillar and the rear pillar in the anteroposterior direction.

Each of the side walls of the cargo bed according to the present invention includes the front pillar, the rear pillar, and the side panel extending between the front pillar and the rear pillar in the anteroposterior direction and having the rib extending in the anteroposterior direction so as to have high rigidity. There is thus no need to provide any intermediate pillar between the front pillar and the rear pillar. Each of the side walls having high rigidity is configured to firmly support the bed rail, whereas the bed rail further improves rigidity of the side wall.

The bed rail is positioned above the side panel with the space being provided therebetween, and the side wall needs no intermediate pillar. The space is thus provided between the bed rail and the side panel along the entire length of the bed rail. The side walls of the cargo bed according to the present invention firmly support the bed rail between the front pillar and the rear pillar and enable multiple utilization of the bed rail along its entire length.

The cargo bed for the utility vehicle preferably has any of the following configurations.

(1) The front pillar, the rear pillar, the side panel, and the bed rail are each made of metal, and the side panel has a front end firmly fixed to the front pillar and a rear end firmly fixed to the rear pillar.

In the configuration (1), each of the side walls is effectively improved in rigidity and supports the bed rail more firmly.

(2) The cargo bed for the utility vehicle has the configuration (1), and the bed rail is firmly fixed to the front pillar and the rear pillar.

In the configuration (2), the bed rail is supported more firmly and the side wall is more effectively improved in rigidity.

(3) The cargo bed for the utility vehicle has the configuration (1), and the bed rail is configured to be detachably attached to the front pillar and the rear pillar.

The configuration (3) allows the bed rail to be attached and detached as necessary. For example, the bed rail is mounted in order to lock cargo. In contrast, the bed rail is dismounted if there is no need to lock cargo. The bed rail is dismounted if the bed rail is not necessary, to inhibit increase in weight of the cargo bed.

(4) The cargo bed for the utility vehicle has the configuration (3), and the bed rail is configured to have a shiftable vertical position.

In the configuration (4), the vertical position of the bed rail is shiftable in accordance with a height of cargo to be locked, to improve loadability (loading property) of the cargo bed.

(5) The cargo bed for the utility vehicle has the configuration (1), and the side panel has an upper end having a cornered U section or a closed section extending in the anteroposterior direction.

In the configuration (5), the side wall is further improved in rigidity by the upper end of the side panel having the cornered U section or the closed section extending in the anteroposterior direction. The side panel with the upper end having the cornered U section achieves improved productivity thereof in comparison to a side wall having the closed section.

BRIEF DESCRIPTION OF THE DRAWINGS

FIG. 6 is a perspective view of a cargo bed according to another embodiment;

DETAILED DESCRIPTION OF THE INVENTION

A utility vehicle according to an embodiment of the present invention will now be described with reference to the accompanying drawings. For easier description, assume that the utility vehicle travels "forward" with respect to the utility vehicle and respective components, and right and left sides in the vehicle width direction of a crew correspond to "right and left sides" of the utility vehicle and the respective components.

First Embodiment

Figure 1:
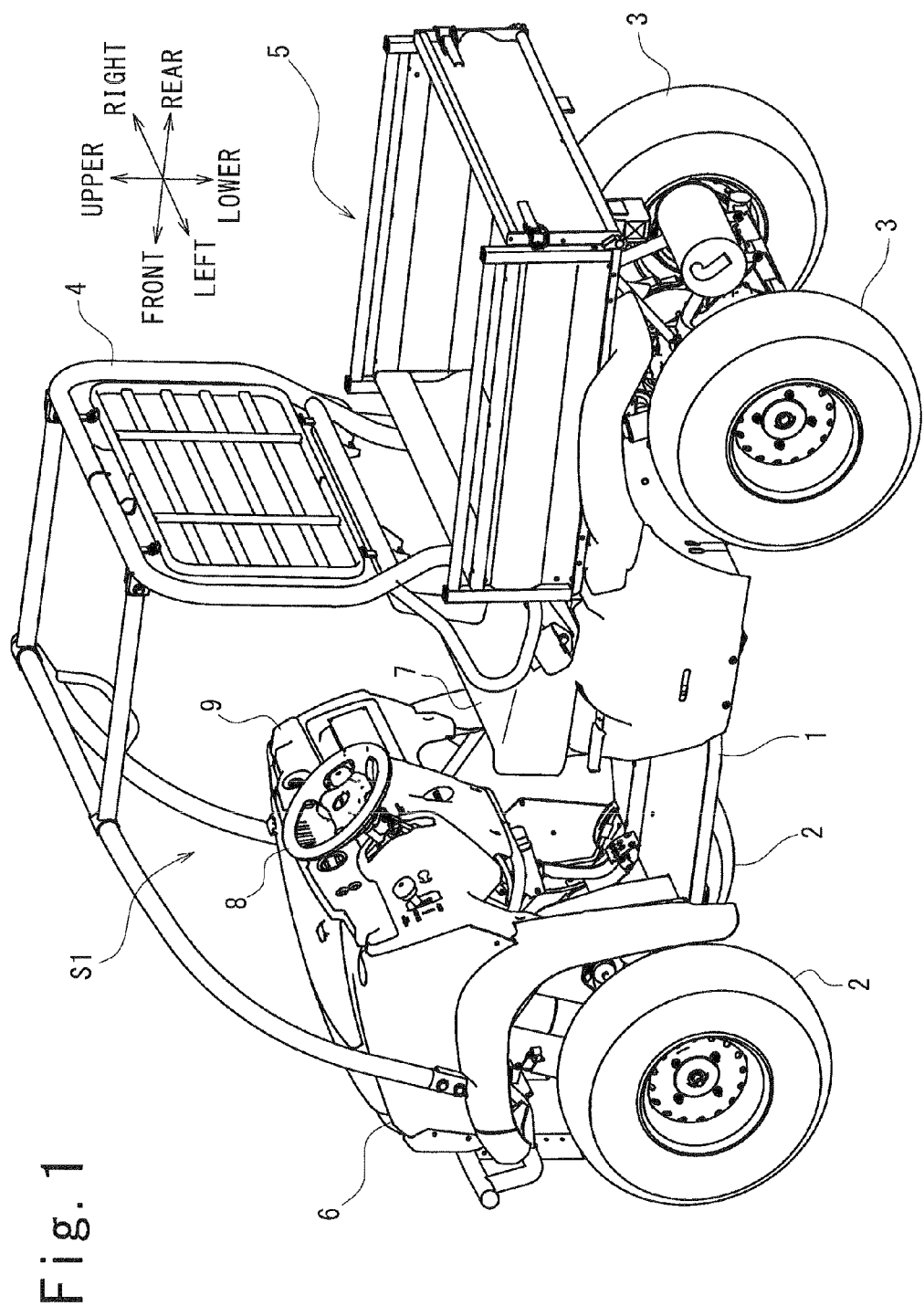
FIG. 1 is a perspective view of a utility vehicle according to an embodiment of the present invention.

In FIG. 1, the utility vehicle includes a chassis frame 1, right and left front wheels 2 supported by a front end of the chassis frame 1, and right and left rear wheels 3 supported by a rear end of the chassis frame 1, a riding space S1 surrounded with a ROPS 4, a cargo bed 5 disposed behind the riding space S1, and a bonnet 6 disposed ahead of the riding space S1. The riding space S1 accommodates a bench type seat 7, and is provided, at its front end, with a steering wheel 8 and a dashboard 9. The ROPS is an abbreviation for a rollover protective structure.

Figure 2:
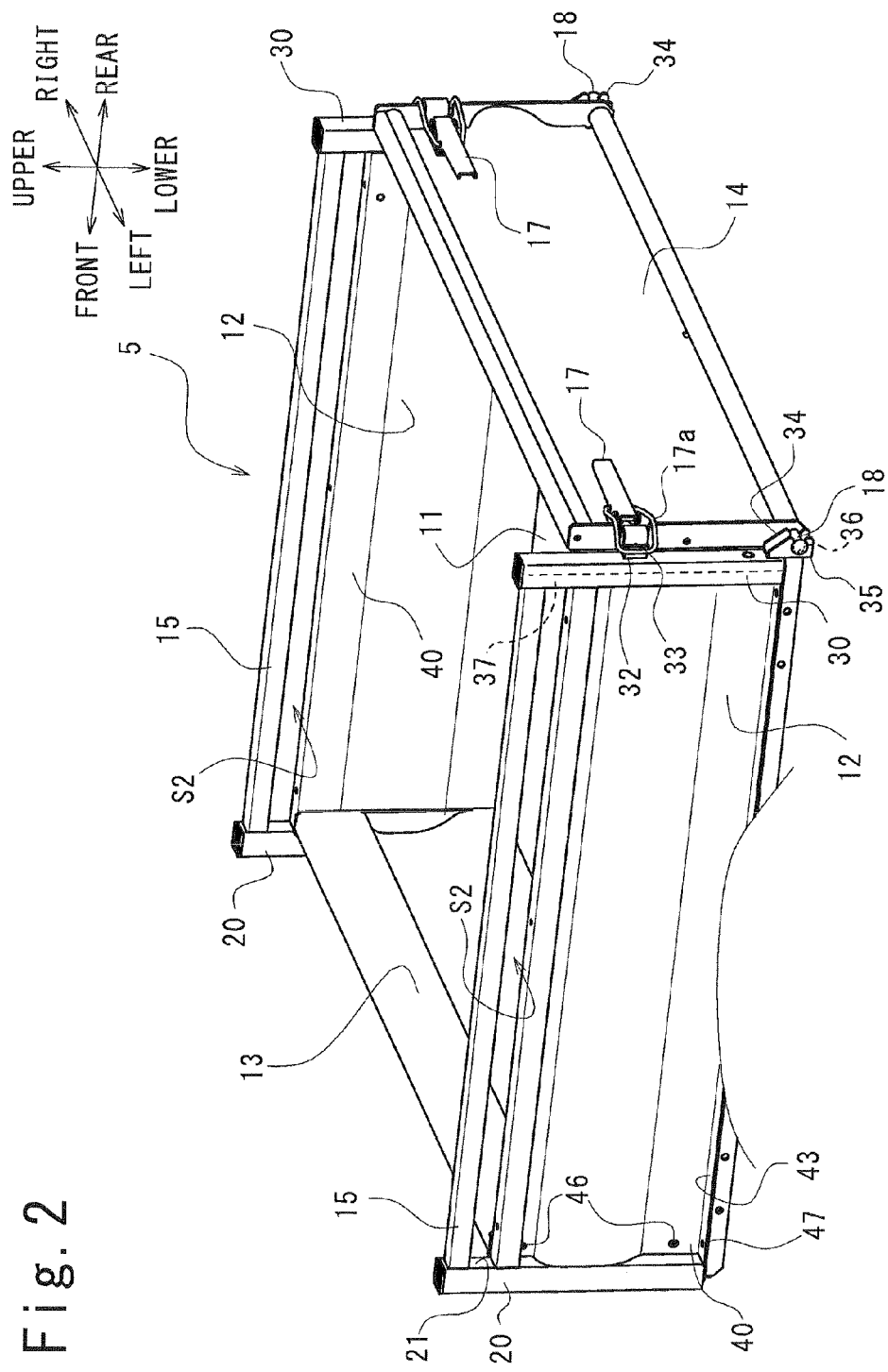
FIG. 2 is an enlarged view of a cargo bed shown in FIG. 1 and the periphery thereof.

As shown in an enlarged view of FIG. 2, the cargo bed 5 includes a bottom plate 11, a pair of right and left side walls 12, a front wall 13, a rear wall 14, and a pair of right and left bed rails 15. The bottom plate 11, the side walls 12, the front wall 13, the rear wall 14, and the bed rails 15 are each made of metal. The bottom plate 11 has a substantially rectangular shape in a planar view and extends substantially horizontally. The pair of right and left side walls 12 has a substantially rectangular shape elongated in the anteroposterior direction in a side view. The side walls 12 extend vertically from respective ends in the vehicle width direction (right and left ends) of the bottom plate 11. The front wall 13 has a substantially rectangular shape elongated in the vehicle width direction in a rear view, and extends vertically from the front end of the bottom plate 11.

The rear wall 14 has a substantially rectangular shape elongated in the vehicle width direction in a rear view, and has a lower end rotatably supported by rear ends of the pair of right and left side walls 12. The rear wall 14 serves as a gate panel configured to be rotatable between a closed position where the rear wall 14 is substantially vertically upright and an open position where the rear wall 14 hangs downward from the bottom plate 11. The rear wall 14 has a pair of right and left lock mechanisms 17 and a pair of right and left hinge shafts 18. The lock mechanisms 17 are provided at respective lateral ends in the vehicle width direction of a rear end surface of the rear wall 14. The hinge shafts 18 extend in the vehicle width direction at lower ends of respective side surfaces in the vehicle width direction of the rear wall 14.

Figure 3:
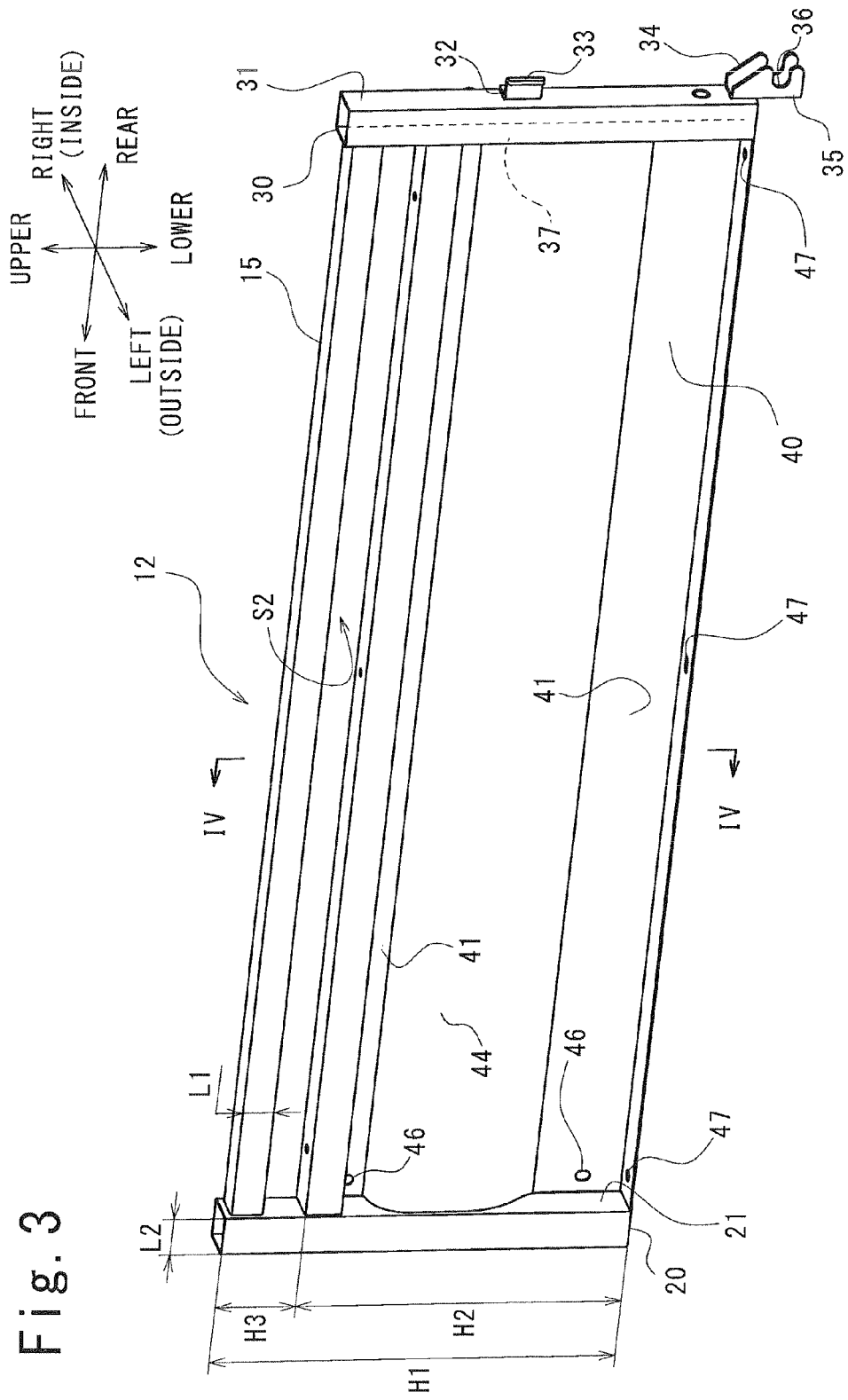
FIG. 3 is a perspective view of a side wall.

Each of the bed rails 15 is a hollow pipe member having a substantially square section with a side length L1 (see FIG. 3). The bed rail 15 has respective surfaces directed in the vertical direction and the vehicle width direction, is disposed above the side wall 12 with a space S2 provided therebetween, and extends in the anteroposterior direction.

FIG. 3 is a perspective view viewed from outside in the vehicle width direction, of the side wall 12. As shown in FIG. 3, the side wall 12 includes a front pillar 20 extending vertically at a front end, a rear pillar 30 extending vertically at a rear end, and a side panel 40 extending between the front pillar 20 and the rear pillar 30 in the anteroposterior direction.

The front pillar 20 and the rear pillar 30 have substantially identical shapes. The front pillar 20 will thus be exemplified for description of common portions between the front pillar 20 and the rear pillar 30. The front pillar 20 is a hollow pipe having a substantially square section with a side length L2. The front pillar 20 has respective surfaces directed in the anteroposterior direction and the vehicle width direction, and extends upward from the bottom plate 11 (see FIG. 2). The side length L2 of the front pillar 20 is more than the side length L1 of the bed rail 15.

The front pillar 20 is vertically longer than the side panel 40 so as to project upward from the side panel 40. More specifically, there is a height difference H3 between the front pillar 20 having a height H1 and the side panel 40 having a height H2. The height difference H3 is configured to be more than the side length L1 of the bed rail 15.

The rear pillar 30 has a rear end surface 31 provided with a lock bracket 32 and a hinge bracket 34. The lock bracket 32 is firmly fixed by welding or the like to a portion slightly above the vertical center of the rear end surface 31. The hinge bracket 34 is firmly fixed by welding or the like to a lower end of the rear end surface 31. The lock bracket 32 and the hinge bracket 34 are bent sheet metal members.

The lock bracket 32 is provided, at its rear end, with an engagement portion 33 extending outward in the vehicle width direction. The engagement portion 33 is configured to engage with a hook 17a (see FIG. 2) of the lock mechanism 17 on the rear wall 14 at the closed position.

The hinge bracket 34 has a downward extension 35 extending downward from the rear pillar 30. The downward extension 35 is provided with a bearing portion 36. The bearing portion 36 is a groove having a U shape with an opened rear side in a side view. The groove has a front end (i.e. a bottom of the U shape) supporting the hinge shaft 18 (see FIG. 2) on the rear wall 14 rotatably about an axis extending in the vehicle width direction.

The side panel 40 is a sheet metal member formed to have a substantially constant section in the anteroposterior direction by bending a plate member along a bend line extending in the anteroposterior direction, and extends upward from the bottom plate 11 (see FIG. 2). The side panel 40 has a front end firmly fixed by welding or the like to a rear end surface 21 of the front pillar 20, and a rear end firmly fixed by welding or the like to a front end surface 37 of the rear pillar 30.

Figure 4:
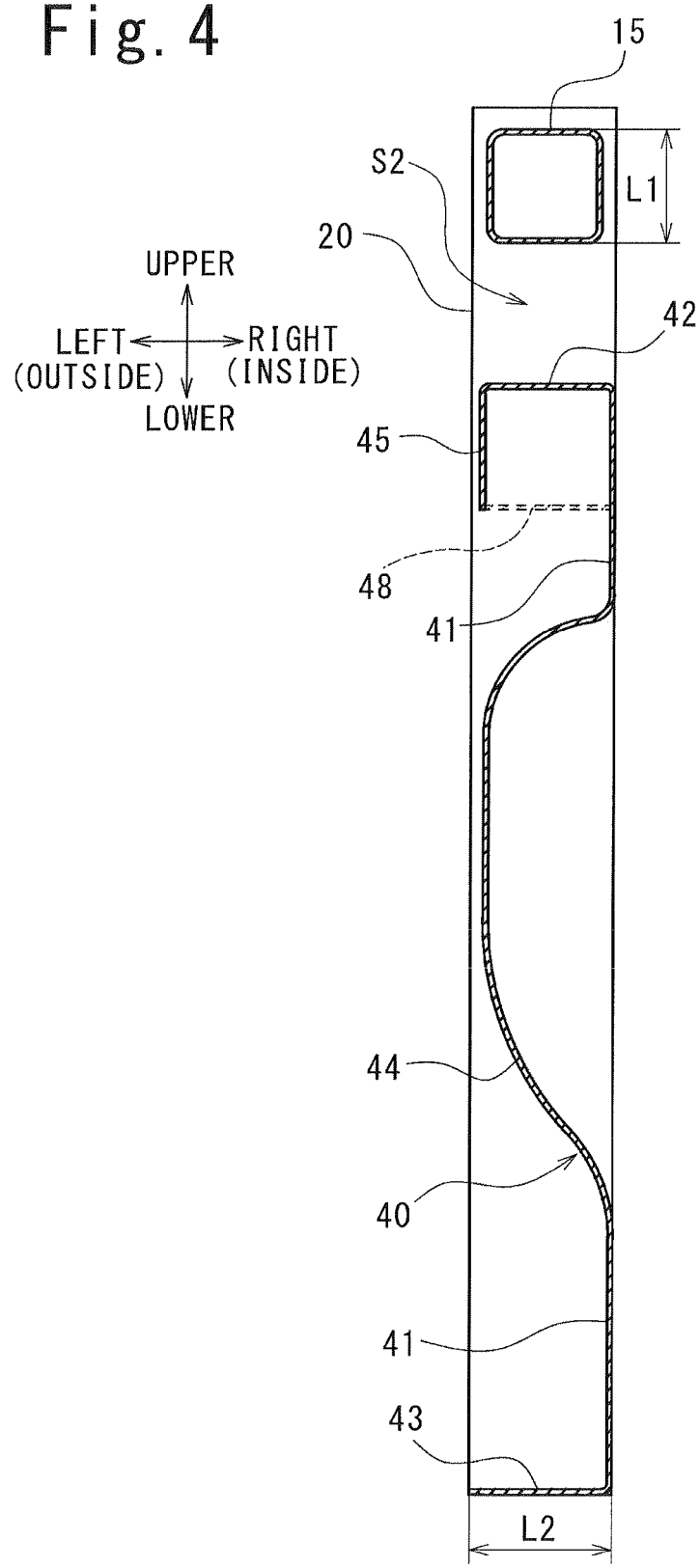
FIG. 4 is a sectional view taken along line IV-IV indicated in FIG. 3.

FIG. 4 is a longitudinal sectional view taken along line IV-IV indicated in FIG. 3. As shown in FIG. 4, the side panel 40 has a vertically extending side surface 41, an upper surface 42 and a lower surface 43 extending outward in the vehicle width direction from an upper end and an lower end of the side surface 41, respectively, a central projection 44 projecting outward in the vehicle width direction substantially at the vertical center of the side surface 41, and a flange 45 extending downward from an outer end in the vehicle width direction of the upper surface 42. The side panel 40 thus has an upper portion in which the side surface 41, the upper surface 42, and the flange 45 form a cornered U section with an opened lower end.

In the vehicle width direction, the side surface 41 is positioned close to an inner end in the vehicle width direction of the front pillar 20, and the flange 45 is positioned close to an outer end in the vehicle width direction of the front pillar 20. The upper surface 42, the lower surface 43, and the central projection 44 each have a length in the vehicle width direction substantially equal to the length in the vehicle width direction of the front pillar 20 and the rear pillar 30, i.e. the side length L2 of the section of the rear pillar 30. The side panel 40 is thus positioned behind the front pillar 20 so as to be entirely overlapped therewith.

As shown in FIG. 3, the side surface 41 is provided, at its front end, with a pair of front wall attachment holes 46 penetrating in the vehicle width direction and aligned vertically with the central projection 44 being interposed between. The lower surface 43 is provided, at is front end, center, and rear end, with side wall attachment holes 47 penetrating vertically.

How to assemble the cargo bed 5 will be described next with reference to FIG. 2.

The lower surface 43 of the side panel 40 of each of the side walls 12 is firmly fixed, from above, to the bottom plate 11. Specifically, each of the side walls 12 is firmly fixed to the bottom plate 11 by insertion of fastening bolts (not shown) from above, through the three side wall attachment holes 47 to fasten to the bottom plate 11.

The front wall 13 has respective ends in the vehicle width direction fastened and fixed to inner wall surfaces of the pair of right and left side walls 12 by fastening bolts (not shown) inserted through the front wall attachment holes 46. The front wall 13 has a lower end fastened and fixed, from above, to the front end of the bottom plate 11 (not shown).

The lower end of the rear wall 14 is supported by rear portions of the side walls 12 rotatably upward and downward by engaging the pair of right and left hinge shafts 18 with the bearing portions 36 of the pair of right and left hinge brackets 34. The rear wall 14 is held at the closed position by engaging the hooks 17a of the lock mechanisms 17 with the engagement portions 33 of the lock brackets 32 provided at the rear ends of the pair of right and left side walls 12.

As shown in FIG. 3, the bed rail 15 has a front end firmly fixed by welding or the like to an upper end of the rear end surface 21 of the front pillar 20, i.e. a portion projecting upward from the side panel 40. The bed rail 15 has a rear end firmly fixed by welding or the like to an upper end of the front end surface 37 of the rear pillar 30, i.e. a portion projecting upward from the side panel 40.

The front pillar 20 and the rear pillar 30 are higher than the side panel 40 by the height difference H3 that is more than the side length L1 of the bed rail 15. The bed rail 15 firmly fixed to the upper ends of the front pillar 20 and the rear pillar 30 is thus positioned above the side panel 40 by a difference between the height difference H3 and the side length L1. In other words, the space S2 having a vertical length equal to the difference between the height difference H3 and the side length L1 is provided between the bed rail 15 and the side panel 40 along an entire length of the bed rail 15. In still other words, the bed rail 15 is positioned above the side panel 40 with the space S2 being provided therebetween.

Figure 5:
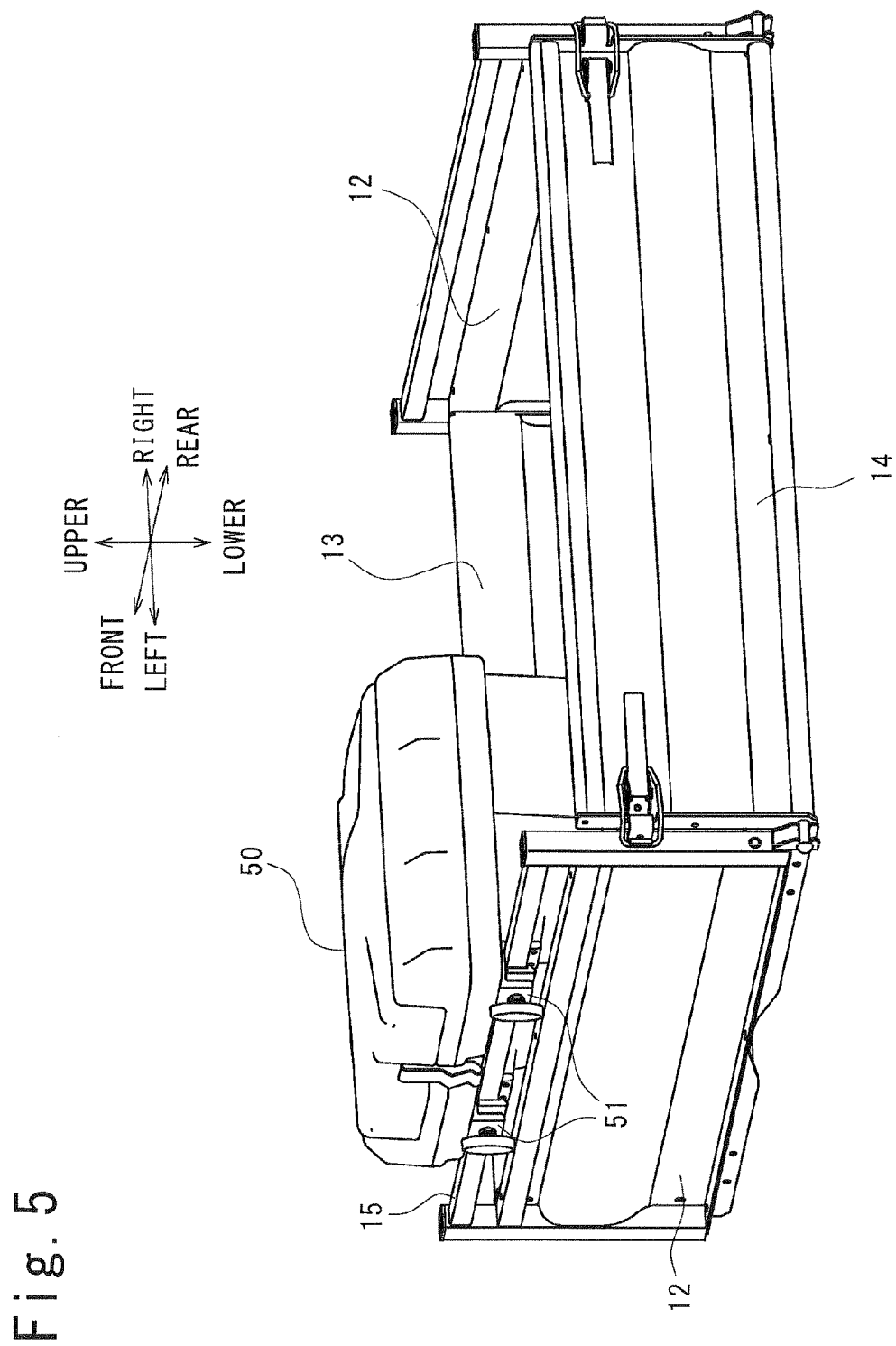
FIG. 5 is a perspective view of a state where an accessory is attached to the cargo bed.

FIG. 5 shows a state where an accessory 50 is attached to the bed rail 15. The accessory 50 is a storage box having an outer end in the vehicle width direction provided with a pair of front and rear clamps 51. The clamps 51 are configured to grip the bed rail 15 in the vehicle width direction. The bed rail 15 according to the present embodiment is configured to be utilized along its entire length. This configuration allows the accessory 50 to be attached at any position in the anteroposterior direction of the bed rail 15 by the clamps 51.

The cargo bed 5 for the utility vehicle thus configured achieves the following effects.

The side walls 12 of the cargo bed 5 each include the front pillar 20, the rear pillar 30, and the side panel 40 extending between the front pillar 20 and the rear pillar 30 in the anteroposterior direction. The side panel 40 is provided with the central projection 44 extending in the anteroposterior direction. The central projection 44 thus serves as a rib to improve planar rigidity of the side panel 40, as well as flexural rigidity within planes parallel to the anteroposterior direction and the vertical direction of the side panel 40 and flexural rigidity in the vehicle width direction. The side wall 12 includes the front pillar 20, the rear pillar 30, and the side panel 40 to have high rigidity. There is thus no need to provide any intermediate pillar between the front pillar 20 and the rear pillar 30. The side wall 12 having high rigidity is configured to firmly support the bed rail 15, whereas the bed rail 15 further improves rigidity of the side wall 12.

The bed rail 15 is positioned above the side panel 40 with the space S2 being provided therebetween, and the side wall 12 needs no intermediate pillar. The space S2 is thus provided between the bed rail 15 and the side panel 40 along the entire length of the bed rail 15. Accordingly, the bed rail 15 is firmly supported between the front pillar 20 and the rear pillar 30 and is allowed to be utilized along its entire length for multiple purposes.

The side wall 12 and the bed rail 15 are both made of metal, so that the side wall 12 is effectively improved in rigidity and supports the bed rail 15 more firmly.

The bed rail 15 is firmly fixed by welding to the front pillar 20 and the rear pillar 30 so as to be firmly supported. Furthermore, the bed rail 15 more effectively improves rigidity of the side wall 12.

The upper end of the side panel 40 has the cornered U section extending in the anteroposterior direction, so that the side panel 40 has high flexural rigidity within planes parallel to the anteroposterior direction and the vertical direction as well as flexural rigidity in the vehicle width direction. The side wall 12 is thus further improved in rigidity. The side panel 40 provided with the upper end having the cornered U section achieves improved productivity of the side panel 40 in comparison to a side wall having a closed section.

Second Embodiment

FIG. 6 is a perspective view of a side wall 112 of a cargo bed 5 for a utility vehicle according to the second embodiment. The side wall 112 according to the second embodiment is different from the side wall 12 according to the first embodiment in that a bed rail 150 is supported by a front pillar 120 and a rear pillar 130 so as to be detachable from the side wall 112 and have a shiftable vertical position.

The bed rail 150 includes a bed rail body 151, and a front leg 152 and a rear leg 153 extending downward from a front end and a rear end of the bed rail body 151, respectively.

Each of the bed rail body 151, the front leg 152, and the rear leg 153 is a hollow pipe member having a substantially square section shape with a side length L1. The front leg 152 and the rear leg 153 are each provided with a plurality of screw holes 154 extending in the vehicle width direction and aligned vertically. The plurality of screw holes 154 of the front leg 152 and the rear leg 153 have respectively equal vertical positions.

The front pillar 120 and the rear pillar 130 of the side wall 112 are substantially equal in height to the side panel 40. The front leg 152 and the rear leg 153 of the bed rail 150 are inserted, from upward, into sections of the front pillar 120 and the rear pillar 130. The front pillar 120 and the rear pillar 130 are each provided, at its upper end, with a bed rail attachment hole 140.

Specifically, the bed rail 150 is inserted into the section of each of the front pillar 120 and the rear pillar 130, and a fastening bolt is inserted through the bed rail attachment hole 140 as well as fastens to one of the screw holes 154. The bed rail 150 is thus firmly fixed to the front pillar 120 and the rear pillar 130. The vertical position of the bed rail 150 is shiftable by changing the fastening target screw hole out of the plurality of screw holes 154. The bed rail 150 is detachable from the front pillar 120 and the rear pillar 130 by detaching the fastening bolts.

The bed rail 150 is thus attached to and detached from the side wall 112 as necessary. For example, the bed rail 150 is mounted to the side wall 112 in order to lock cargo, and the bed rail 150 is dismounted if there is no need to lock cargo. The bed rail 150 is dismounted if the bed rail 150 is not necessary, to inhibit increase in weight of the cargo bed 5. The vertical position of the bed rail 150 is shiftable in accordance with a height of cargo to be locked, to improve loadability of the cargo bed 5.

The front leg 152 and the rear leg 153 preferably have the side length L1 substantially equal to an inner side length L3 of the sections of the front pillar 120 and the rear pillar 130. The front leg 152 and the rear leg 153 of the bed rail 150 are thus inserted into the sections of the front pillar 120 and the rear pillar 130 with no backlash.

The upper end of the side panel 40 has the cornered U section in each of the embodiments described above. The upper end alternatively has a closed section. Specifically, as indicated by broken lines in FIG. 4, there is optionally provided a second flange 48 extending inward in the vehicle width direction from a lower end of the flange 45 and joined by welding or the like to the side surface 41. The upper end of the side panel 40 has the closed section extending in the anteroposterior direction, so that the side panel 40 has higher flexural rigidity within planes parallel to the anteroposterior direction and the vertical direction as well as higher flexural rigidity in the vehicle width direction. The side wall 12 is thus further improved in rigidity.

Figure 7A:
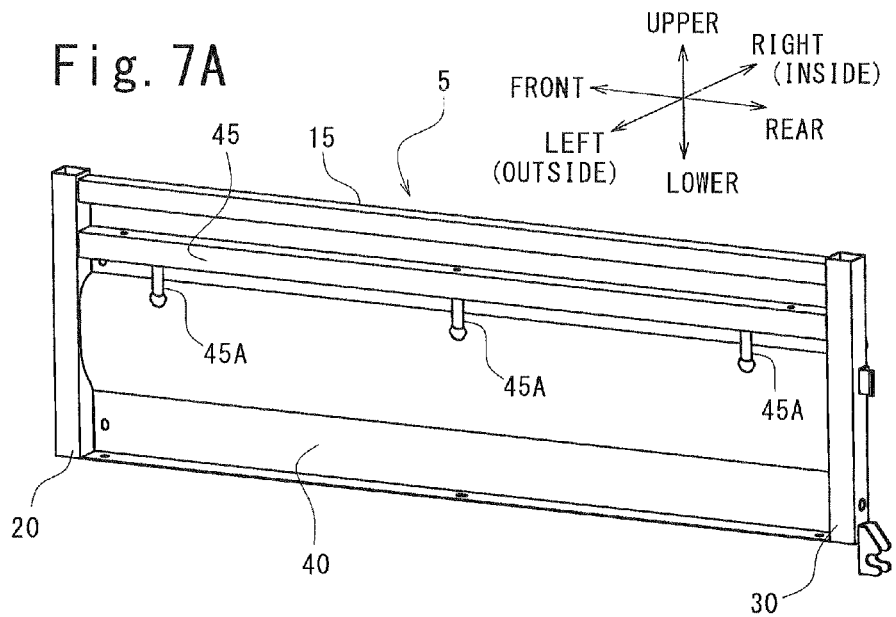
FIG. 7A is a perspective view of the cargo bed, showing hooks provided on the side wall of the cargo bed.
Figure 7B:
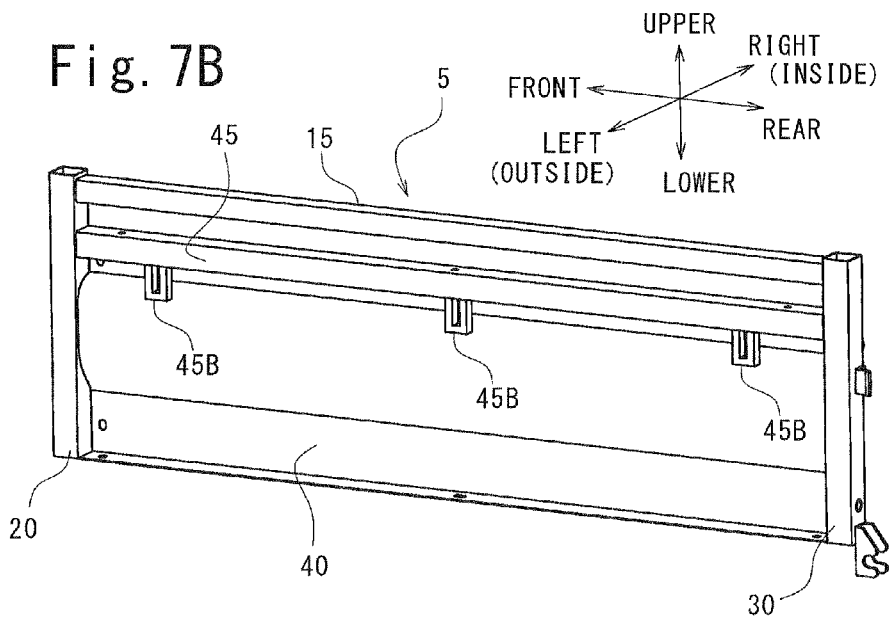
FIG. 7B is a perspective view of the cargo bed, showing hooks according to a modification example provided on the side wall of the cargo bed.
Figure 7C:
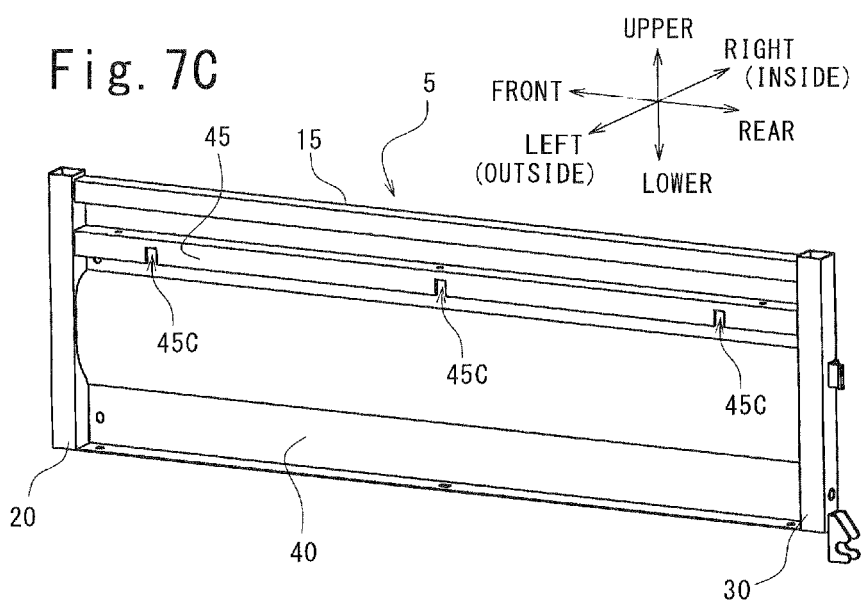
FIG. 7C is a perspective view of the cargo bed, showing cutouts formed in the side wall of the cargo bed.

As shown in FIGS. 7A to 7C, the flange 45 is optionally provided with hooks 45A or 45B, or cutouts 45C each configured to hang cargo. FIG. 7A shows the hooks 45A each provided as a cylindrical rod having a radially expanded lower end and firmly fixed by welding or the like to the flange 45 so as to project downward.

FIG. 7B shows the hooks 45B according to a different example. The hooks 45B are each provided as a plate member firmly fixed by welding or the like to the flange 45 so as to project downward into a U shape. Each of the hooks 45B is the plate member, so as to have a portion that is joined to the flange 45 and linearly extends in the anteroposterior direction. The hooks 45B achieve better joining workability in comparison to the hooks 45A provided as the cylindrical rods.

FIG. 7C shows the cutouts 45C provided at the flange 45 in place of the hooks 45A or 45B. The cutouts 45C are each formed by cutting upward from a lower edge of the flange 45, a portion having a predetermined length. The cutouts 45C each allow a cargo locking hook or the like to hang therefrom.

Figure 7D:
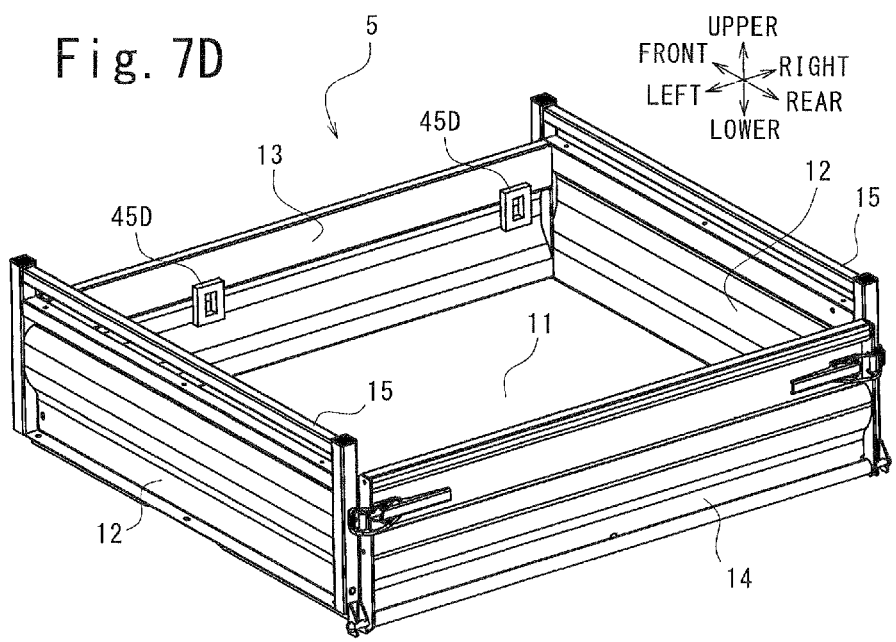
FIG. 7D is a perspective view of the cargo bed, showing hooks provided on a front wall of the cargo bed.

The front wall 13 is optionally provided with hooks 45D as shown in FIG. 7D. Each of the hooks 45D has a rectangular shape with a central opening, and has an upper edge firmly fixed by welding or the like to a rear end surface of the front wall 13.

The hooks 45A, 45B, and 45D, and the cutout 45C are optionally provided in combination, and are alternatively provided at the bed rail 15.

What is claimed is:

1. A cargo bed for a utility vehicle comprising a bottom plate, and a pair of right and left side walls extending upward from right and left ends of the bottom plate,
    each of the side walls including:
    a front pillar extending vertically at a front end of the bottom plate and configured by a pipe member;
    a rear pillar extending vertically at a rear end of the bottom plate and configured by a pipe member;
    a side panel extending between the front pillar and the rear pillar in an anteroposterior direction and having a rib extending in the anteroposterior direction; and
    a bed rail positioned above the side panel with a space being provided therebetween, and extending between the front pillar and the rear pillar in the anteroposterior direction, wherein
    the front pillar, the rear pillar, the side panel, and the bed rail are each made of metal, and
    the side panel has a front end firmly fixed to a rear end surface of the front pillar by welding and a rear end firmly fixed to a front end surface of the rear pillar by welding.

2. The cargo bed for a utility vehicle according to claim 1, wherein the bed rail is firmly fixed to the rear end surface of the front pillar and the front end surface of the rear pillar by welding and without being supported at any positions between front pillar and the rear pillar.

3. The cargo bed for a utility vehicle according to claim 1, wherein the bed rail is configured to be inserted into sections of the front pillar and the rear pillar and be detachably attached to the front pillar and the rear pillar.

4. The cargo bed for a utility vehicle according to claim 3, wherein the bed rail is configured to have a shiftable vertical position.

5. The cargo bed for a utility vehicle according to claim 1,
    wherein the side panel has an upper end having a cornered U section or a closed section extending in the anteroposterior direction, and
    wherein the upper end of the side panel is provided with at least one hook.

* * * * *